United States Patent

[11] 3,593,190

[72] Inventor Alan R. Reinberg
Dallas, Tex.
[21] Appl. No 816,667
[22] Filed Apr. 16, 1969
[45] Patented July 13, 1971
[73] Assignee Texas Instruments Incorporated
Dallas, Tex.

[54] ELECTRON BEAM PUMPED SEMICONDUCTOR LASER HAVING AN ARRAY OF MOSAIC ELEMENTS
12 Claims, 5 Drawing Figs.

[52] U.S. Cl. ............ 331/94.5, 317/234
[51] Int. Cl. ............ H01s 3/18
[50] Field of Search ............ 331/94.5; 317/234, 235, 307/312; 313/108 D; 250/217 SS

[56] References Cited
UNITED STATES PATENTS

| | | | |
|---|---|---|---|
| 3,239,688 | 3/1966 | Price | 307/203 |
| 3,257,626 | 6/1966 | Marinace et al. | 331/94.5 |
| 3,290,539 | 12/1966 | Lamorte | 313/114 |
| 3,349,475 | 10/1967 | Marinace | 29/578 |
| 3,359,508 | 12/1967 | Hall | 331/94.5 |
| 3,361,988 | 1/1968 | Chynoweth | 331/94.5 |
| 3,319,068 | 5/1967 | Beale et al. | 250/217 |
| 3,396,344 | 8/1968 | Broom | 331/94.5 |
| 3,505,613 | 4/1970 | Campbell et al. | 331/94.5 |

OTHER REFERENCES

Basov et al. IEEE JOUR. OF QUANT ELECT., vol QE-2, PP 594— 97, Sept 1966
Lax SOLID STATE DESIGN. vol 6, pp 19— 23 March, 1965
Lax IEEE SPECTRUM, July, 1965, pp 62— 75
Hurwitz: APP. PHYS. LETT. vol. 8, pp 121— 4, March, 1966
Melngailis: APP. PHYS. LETT., vol. 6, pp. 59— 60, Feb. 1965
Popov: APPLIED OPTICS, vol. 6, pp 1818— 24, Nov., 1967

Primary Examiner—Ronald L. Wibert
Assistant Examiner—Edward S. Bauer
Attorneys—Samuel M. Mims, Jr., James O. Dixon, Andrew M. Hassell, Harold Levine, Melvin Sharp, William E. Hiller and John E. Vandigriff ABSTRACT: An electron beam pumped laser wherein the radiating crystal comprises a semiconductor wafer and a mosaic array of radiating elements. Each radiating element in the array emits radiation in a direction coinciding with the axis of the pumping electron beam. Stimulated emission transverse to the pumping electron direction is suppressed by dimensioning each radiating element to prevent gain in the transverse direction. The mosaic of radiating elements may be formed by etching or cutting slots in a semiconductor slice or by direct growth on the semiconductor slice.

NORMAL GEOMETRY

RADIATING MIRROR GEOMETRY

ELECTRON GUN POWER SUPPLY

ELECTRON BEAM PUMPED SEMICONDUCTOR LASER HAVING AN ARRAY OF MOSAIC ELEMENTS

This invention relates to electron beam pumped lasers, and more particularly to electron beam pumped lasers emitting radiation along an axis coinciding with the axis of the incident pumping electron direction.

Since the first observations of stimulated emission in gallium arsenide in 1962, considerable progress has been made in the field of semiconductor lasers. Semiconductor lasers have been made from many pure compounds and from alloys such as $CDS_xSe_{1-x}$ and $GaAs_xP_{1-x}$. The wavelength of coherent radiation has been extended through the visible into the ultraviolet and out to the far infrared.

Several pumping schemes have been employed to cause the semiconductor materials to lase including: PN junctions, electron beam pumping, and optical pumping. Electron beam pumping employs a beam of high energy electrons directed at a flat face of the semiconductor wafer. The high energy electrons penetrate several microns into the material (depending upon their initial energy) and lose a large fraction of their energy by creating many low energy electron-hole pairs. To date, coherent radiation has been primarily observed as emitting from the semiconductor wafer in a direction perpendicular to the face bombarded by the high energy electrons.

Semiconductor lasers are usually limited to low power operations; the limiting factor being the size of the emitting area, i.e., the faces of the resonator through which stimulated emission may be observed. For diodes, the maximum width of the PN junction for efficient operation determines the maximum size of the emitting area (per unit length of diode). For the electron beam pumped laser operating in the normal geometry, the emitting area is determined by the width of the electron beam in one direction and the thickness over which population inversion is achieved along the direction of the incident beam, usually only a few microns. The basic difficulty encountered by workers who have attempted to improve the power output of electron beam pumped lasers is the manner in which the electron beam loses energy in penetrating through the crystal. The differential energy loss results in there being a maximum in the population inversion along a plane perpendicular to the incident electron direction and whose distance below the face on which the beam is incident depends on the initial electron energy and on the atomic weight of the material. The maximum in the differential loss and hence in the population inversion causes the stimulated emission to occur along the direction in which this maximum is maintained. Since the maximum is maintained only over a small depth of the semiconductor wafer thereby yielding a small emitting area, previously only low power lasers have resulted by electron beam pumping.

An object of the present invention is to provide improved power outputs from an electron beam pumped laser. Another object of this invention is to provide electron beam pumped lasers emitting along an axis coinciding with the incident direction of the pumping electrons. A further object of this invention is to quench the transverse mode radiation from an electron beam pumped laser. Still another object of this invention is to provide a semiconductor wafer chopped into a mosaic of small elements for transverse mode suppression in an electron beam pumped laser. An additional object of this invention is to provide a mosaic array of radiating elements for transverse mode quenching of stimulated radiation in an electron beam pumped laser.

In accordance with the present invention, the radiating wafer of an electron beam pumped laser comprises a semiconductor material having a mosaic of radiating elements arranged over the surface thereof. The radiating elements may be formed on the semiconductor material by crystal growth or by forming a grid in the semiconductor slice to outline the radiating element. With either method, the individual radiating elements are dimensioned to quench stimulated emission of radiation in a direction transverse to the axis of the pumping electron beam. With the transverse mode radiation quenched, stimulated emission may be observed in a direction coinciding with the axis of the pumping energy.

A more complete understanding of this invention and its advantages will be apparent from the specification and claims and from the accompanying drawings illustrative of the invention.

Referring to the drawings.

Figure 1:
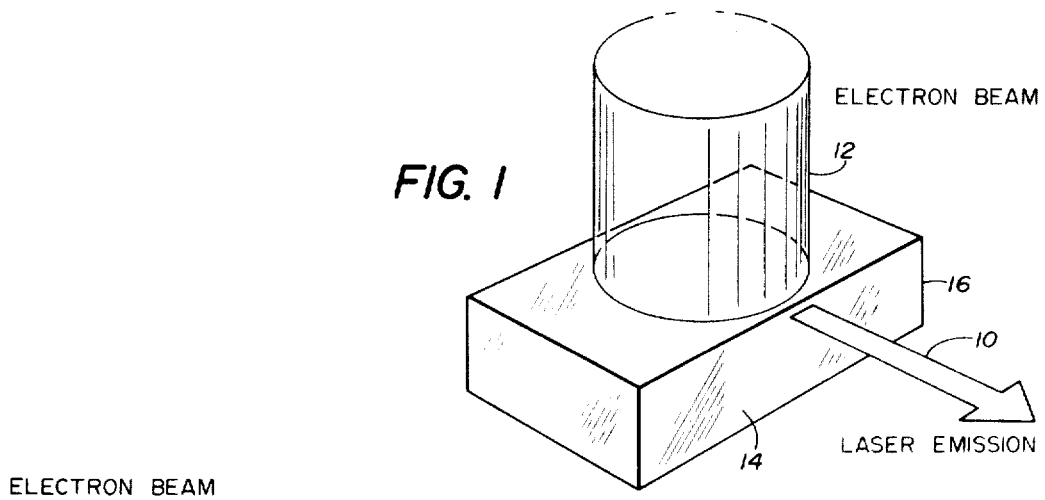
FIG. 1 illustrates prior art laser emission from a semiconductor wafer employing an electron pumping source.

Electron beam pumping of semiconductors has been successfully used to produce laser action in nearly all the II—VI compounds and all of the direct band gap III—V compounds as well as several other classes of semiconducting elements and compounds. In its simplest form, electron beam pumping consists of merely focusing a high energy beam 12 of electrons, as illustrated in FIG. 1, with as high a current density as is required, onto a semiconductor wafer 16, which is usually in the form of a small Fabry-Perot resonator. The principle of operation of an electron beam pumped laser is quite simple. High energy electrons are focused on the semiconductor wafer 16. These electrons penetrate several microns into the wafer, depending on the initial energy and the material, creating large numbers of electron-hole pairs which form degenerate populations. For electron beam pumped lasers as they were operated in the prior art, as illustrated in FIG. 1, the light output, indicated by the reference numeral 10, is observed to be most intense in a direction at right angles to the electron beam 12. The cavity faces 14 (only one of which is shown) of the semiconductor wafer 16 are usually designed so that radiation traveling in this direction will have a high-Q resonator.

Figure 3:
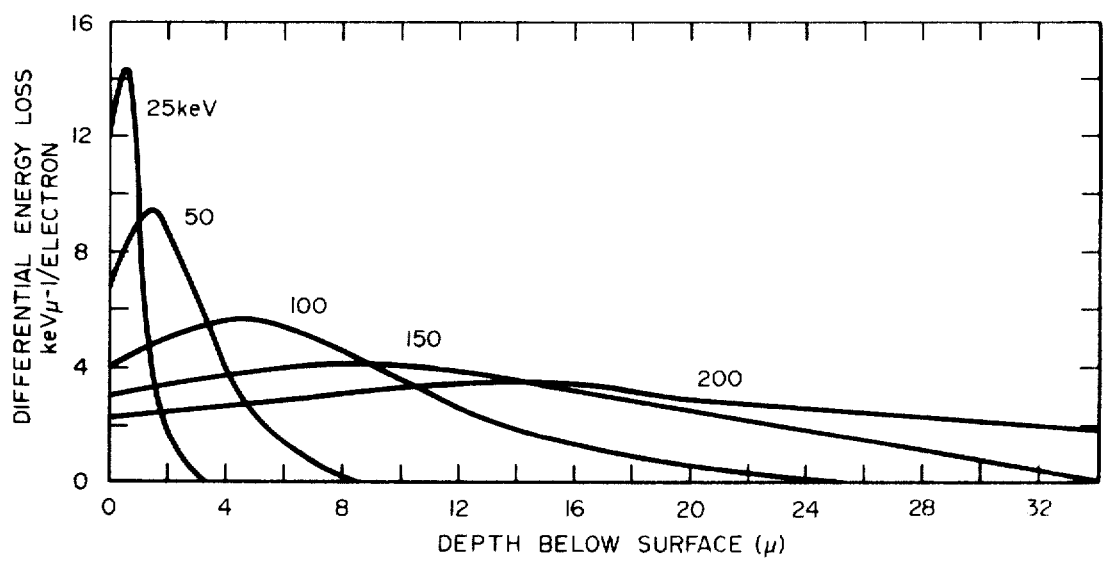
FIG. 3 is a plot of differential energy loss versus penetration depth for electron energy incident on a semiconductor wafer.

Referring to FIG. 3, there is shown a plot of differential energy loss versus penetration depth for a gallium arsenide wafer. The maximum in the differential loss and hence in the population inversion (ignoring diffusion which has been shown to be negligible) causes the stimulated emission to occur in the direction indicated by the reference numeral 10. Roughly, the energy dissipation peak occurs between 1 and 2 microns below the surface on which the electrons are incident for a 50 Kev. electron source, about 1 micron for a 25 Kev. electron source and to as much as 16 microns for a 200 Kev. source. Thus, even with very high energy electron beams, the preferred direction of lasing from a semiconductor wafer occurs in a direction perpendicular to the electron beam 12. Since the area of the emitting surface of the wafer 16, in a direction perpendicular to the pumping beam 12 (the cavity face 14), is relatively small compared to the incident beam surface, electron beam pumped lasers of the prior art are relatively low powered devices.

Figure 2:
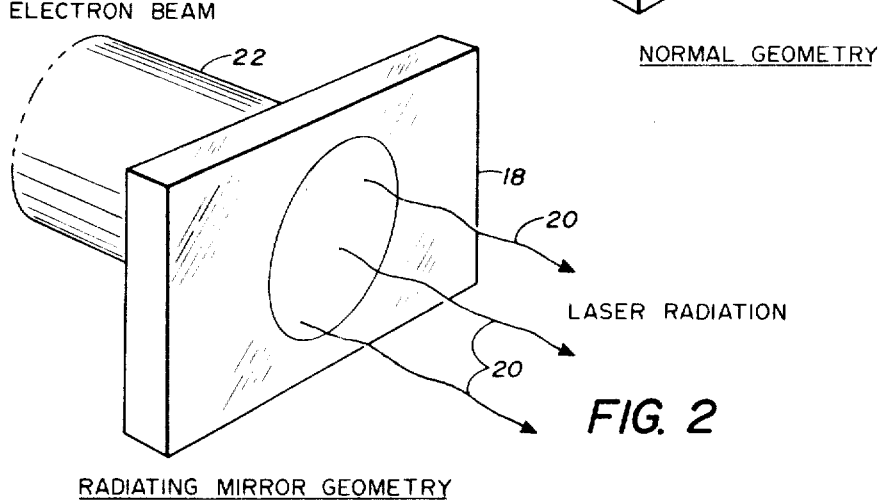
FIG. 2 illustrates laser radiation along an axis coinciding with the axis of an electron pumping source in accordance with the present invention.

In the present invention, an electron beam pumped laser makes use of what has come to be called "Radiating Mirror Geometry" (RMG). In the RMG mode, radiation is constrained to be emitted in a direction parallel to the incident direction of the electron beam 22, as illustrated in FIG. 2. Laser radiation is emitted from the semiconductor wafer 18 in a direction indicated by the wavelines 20. The axis of the laser radiation coincides with the axis of the pumping electron beam 22. For electron beam pumped lasers operating in the RMG mode, the power limitation is, in principle, only the size of the crystal and the availability of an electron source capable of providing the necessary current densities over the entire crystal area. The basic difficulty in producing laser radiation along an axis coinciding with the energy beam is due to the manner in which the electron beam loses energy in penetrating into the crystal, as illustrated in FIG. 3 and described previously.

Since the stimulated emission intensity depends on the product $\alpha L$, where $\alpha$ is the gain and L the length of the active region, to quench transverse radiation, it is necessary to reduce the length of the active region transverse to the electron beam below a value that will produce laser radiation for the gain of the active region. It has been experimentally determined that a cavity with an active length smaller than about 15 microns will generally not sustain lasing operation. Thus, if the bombarded surface of the wafer 16 is divided into a mosaic of individual radiating elements, having a dimension transverse of the electron beam 12 less than about 15 microns, emission will be quenched in the direction 10 and would occur along the direction 20, provided the electron penetration depth is sufficient to provide a population inversion over a sufficiently long path length of the individual radiating elements. Penetration depth is determined by the beam voltage which in turn is limited by the threshold for irreversible damage by displacement of the lightest ion in the crystal. Referring to FIG. 3, it will be noted that a 150 Kev. and a 200 Kev. electron source have a penetration depth in excess of 15 microns.

Figure 4:
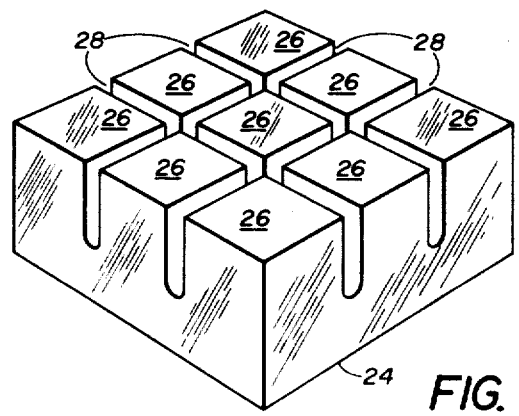
FIG. 4 is an isometric of a mosaic structured electron beam pumped semiconductor wafer.

Referring to FIG. 4, there is shown a portion of a semiconductor wafer 24 where the surface bombarded by electron energy is divided into a mosaic of individual radiating elements 26 to quench transverse radiation. The substrate material for the radiating crystal 24 may be a semiconductor such as gallium arsenide or cadmium sulfide. By standard photomasking and etching techniques, slots 28 are etched in the substrate to a depth in excess of the peak in the electron energy loss curve (FIG. 3) for a given Kev. source to define the individual elements 26. Typically, the slots 28 are etched to a depth in excess of 30 microns in a wafer 50 microns thick. The individual radiating elements 26 are on the order of 10 microns on a side. This is less than the 15 micron active cavity length determined to be the minimum which will sustain stimulated emission.

A high energy electron beam incident on the wafer 24 in a direction of the mosaic of radiating elements, produces a differential energy loss in each radiating element in a manner described previously and as illustrated by the curves of FIG. 3. Note, that the electron beam is not divided into sections to produce an array of energy loss patterns, but rather the wafer 24 is chopped into a mosaic of radiating elements to produce the energy loss patterns. Since the dimension transverse of the incident electron beam is less than that necessary to maintain emission in that direction, transverse radiation from the crystal 24 will be quenched. However, a population inversion will take place in each of the elements with the emission therefrom in a direction along an axis coinciding with the axis of the pumping energy source. For a 200 Kev. electron source, sufficient energy will be available to cause laser radiation from the crystal 24 in a direction opposite from the mosaic of radiating elements.

In addition to photomasking and etching techniques, a mosaic of radiating elements may also be formed by cutting the slots 28 in the semiconductor material to the desired depth. To further improve the quenching of transverse radiation, the slots 28 are filled with a material opaque to the radiating wavelength of the semiconductor material. Another technique for producing a radiating crystal of a mosaic of radiating elements for RMG operation is to dope the semiconductor wafer 24 with a material opaque to the radiating wavelength. This dopant is then diffused into the wafer 24 to a depth to quench stimulated emissions in a direction transverse to the incident electron beam.

Still another technique for producing a radiating crystal of a mosaic of radiating elements is to grow an array of single crystals on a semiconductor slice in the desired pattern. Each crystal then comprises one of the radiating elements of the mosaic illustrated in FIG. 4. It is not essential that the individual elements all have the same dimensions or all be of the same configuration. They may be square or rectangular, as shown, or have an irregular shape. Again, if the crystal growing technique is employed, a filler material may be used to surround each element to further minimize radiation transverse to the incident electron beam.

Figure 5:
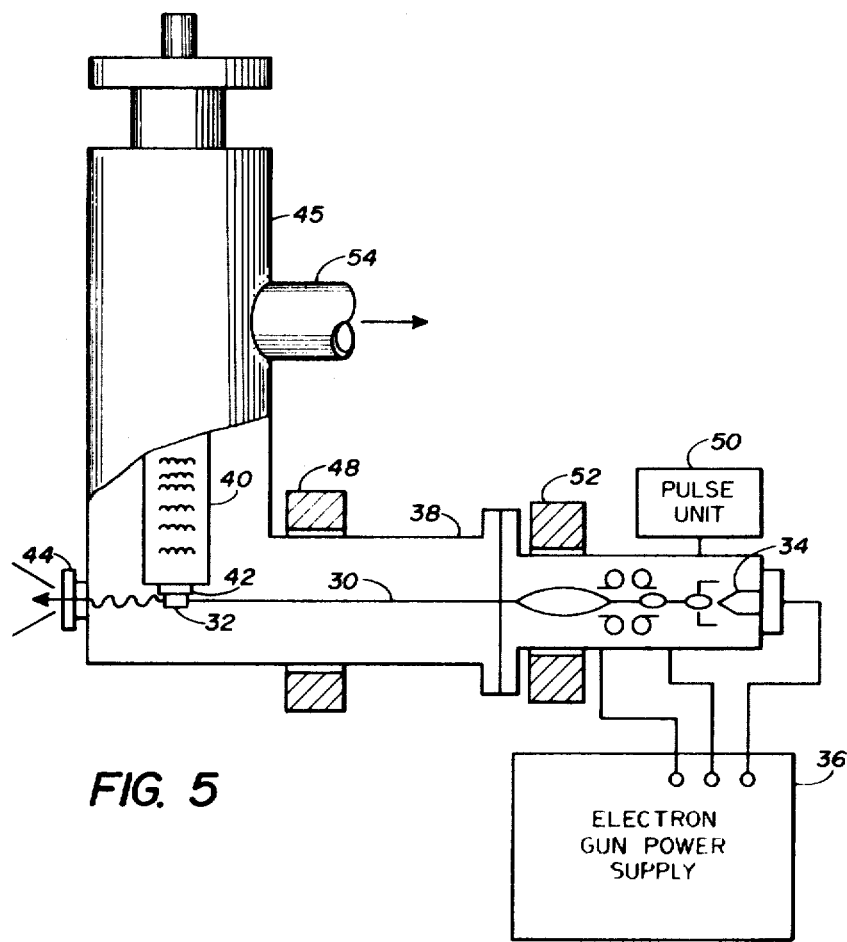
FIG. 5 is a schematic of a magnetic deflection electron beam pumping semiconductor laser system.

Referring to FIG. 5, there is shown schematically an apparatus for an electron beam pumped laser where an electron beam 30 is incident on the face of a wafer 32. An electron gun 34 is supplied from a high voltage DC source 36 and emits a stream of high energy electrons. The energy of the electron beam 30 must be sufficient to insure that an electron will penetrate into the wafer 32 and the differential energy loss does not peak in a near surface region; this requires a DC source 36 generating a voltage in excess of 150 Kev.

Although an electron gun has been illustrated and described, other sources of high energy electrons may be used to produce laser action in the wafer 24. For example, field emission sources are available which readily produce the required current densities at 150 Kev. or greater.

The electron beam 30 is directed through a tube 38 terminating at a dewar container 40 of a liquefied gas, such as helium, and including a cold finger 42. Attached to the cold finger 42 to emit radiation through a window 44 is the semiconductor wafer 32. The dewar 40 is mounted within a housing 45 attached by means of a pipe 54 to a vacuum system (not shown).

Magnetic deflection coils 48 are positioned on opposite sides of the tube 38 in an area between the electron gun 34 and the wafer 32. The deflection coils 48 generate a magnetic field to deflect the electron beam 30 to the face of the semiconductor wafer 32. Because electron beam pumped lasers have presently been operated only in the pulsing mode, a pulse controller 50 controls the operation of the electron gun 34. A typical pulsing control provides pulses from 5 nanoseconds to 200 nanoseconds. To provide maximum coverage of the semiconductor wafer 32 by the electron beam 30, magnetic focusing lens 52 are provided between the electron gun 34 and the deflection coils 48.

In operation, the tube 38 is evacuated by means of a vacuum pump (not shown) connected to the line 54. High energy electrons from the electron beam 30 are incident on the semiconductor wafer 32 as positioned by the deflection coil 48 and focused by the lens 52. Employing a semiconductor wafer having a mosaic of radiating elements, the elements are positioned facing the electron gun 34. The electron beam 30 is incident on each radiating element and produces stimulated emission of radiation along a path 56 which has an axis parallel to the electron beam 30.

Although only one embodiment of the invention and several semiconductor materials have been described in detail herein as shown in the accompanying drawings, it will be evident that various further modifications and additions are possible without departing from the scope of the invention. The number of semiconductor materials made to lase is continuously changing and all such materials are considered within the scope of the invention.

What I claim is:

1. A radiating crystal in an electron beam pumped laser, comprising:
    a semiconductor slice, and
    a mosaic of semiconductor radiating elements arrayed over the surface of the semiconductor slice in the direction of the incident electron beam and dimensioned to quench stimulated emission of radiation in a direction transverse to the beam axis and each of said mosaic elements forming an optical cavity to stimulate radiation along an axis parallel to the incident electron beam.

2. A radiating crystal in an electron beam pumped laser as set forth in claim 1 wherein the longest dimension transverse the incident electron beam for each radiating element does not exceed 15 microns.

3. A radiating crystal in an electron beam pumped laser as set forth in claim 1 wherein the mosaic of radiating elements comprises an array of single crystals grown on the semiconductor slice.

4. A radiating crystal in an electron beam pumped laser as set forth in claim 3 including a filler material opaque to the radiating wavelength of the grown crystals surrounding each of the mosaic of radiating elements to further minimize stimulated emission transverse of the electron beam.

5. A radiating crystal in an electronic beam pumped laser comprising:
a semiconductor slice, and
a grid formed in one surface of the semiconductor slice and extending to a depth in excess of the maximum electron energy loss to quench the stimulated emission of radiation in a direction transverse to the beam axis and portions of said one surface forming an optical cavity with the opposite surface of said slice to stimulate radiation along an axis parallel to the incident electron beam.

6. A radiating crystal in an electron beam pumped laser as set forth in claim 5 wherein said grid comprises an array of transverse slots etched into said semiconductor slice.

7. A radiating crystal in an electron beam pumped laser as set forth in claim 6 including a filler material opaque to the radiating wavelength of the semiconductor slice, said filler material deposited into the etched slots to further minimize stimulated emission transverse of the electron beam.

8. A radiating crystal in an electron beam pumped laser as set forth in claim 5 wherein said grid comprises an array of transverse lines of a diffused dopant opaque to the radiating wavelength of the semiconductor slice and extending to a depth in excess of the maximum electron energy loss to quench the stimulated emission of radiation in a direction transverse of the incident electron beam.

9. An electron beam pumped laser comprising:
a semiconductor slice,
a source of high energy electrons directed to and penetrating into one face of the semiconductor slice to cause stimulated emission of radiation therefrom, and
a mosaic of semiconductor radiating elements arrayed over the faces of the semiconductor slice exposed to the electron beam and dimensioned to quench stimulated emission of radiation in a direction transverse to the beam axis and each of said mosaic elements forming an optical cavity to stimulate radiation in a direction along an axis parallel to said electron beam.

10. An electron beam pumped laser as set forth in claim 9 wherein the mosaic of radiating elements comprises a grid formed into one surface of the semiconductor slice by a process of diffusing a dopant opaque to the radiating wavelength to a depth in excess of the maximum electron energy loss to quench the stimulated emission of radiation.

11. An electron beam pumped laser as set forth in claim 9 wherein the mosaic of radiating elements comprises an array of single crystals grown on the semiconductor slice.

12. An electron beam pumped laser as set forth in claim 11 including a filler material opaque to the radiating wavelength of the semiconductor slice surrounding each of the mosaic of radiating elements to further minimize stimulated emission transverse of the electron beam.